Patented July 29, 1952

2,605,260

UNITED STATES PATENT OFFICE 2,605,260

AZONITRILES CONTAINING TERTIARY AMINO SUBSTITUENTS

John Raven Johnson, Ithaca, N. Y., assignor to E. I. du Pont de Nemours & Company, Wilmington, Del., a corporation of Delaware No Drawing. Application May 26, 1949, Serial No. 95,572

6 Claims. (Cl. 260—152)

This invention relates to new aliphatic azo compounds containing tertiary amine groups and to the use thereof in the addition polymerization of polymerizable organic compounds.

In addition polymerization processes the catalysts or initiators hitherto most frequently mentioned in the art and also most widely used are in general peroxidic compounds, e. g. benzoyl peroxide, ammonium persulfate, etc. The peroxidic catalysts while valuable and useful have certain disadvantages, e. g. discoloration of polymer, decoloration of dyestuffs added to the monomer, insolubilization of the polymer, etc.

This invention has as an object the provision of new compounds. A further object is the provision of new catalysts or initiators for addition polymerization of polymerizable ethylenic compounds. Another object is the provision of new catalysts or initiators for chain mechanism reactions promoted by free radicals. Other objects will appear hereinafter.

These objects are accomplished by the invention of azo compounds having an acyclic azo, —N=N—, group which has at least one but preferably each of its valences satisfied by, i. e., bonded to a non-aromatic radical, the azo group being bonded to tertiary carbon of said radical, i. e., to a carbon attached to three other carbons, one of which has all of its remaining valences satisfied by oxygen and/or nitrogen, i. e., has all its remaining valences satisfied only by elements of atomic number of seven to eight and said radical aliphatic in character having a carbon bearing a tertiary amino group. The invention also includes the use of these azo compounds in the addition polymerization of ethylenic compounds subject to addition polymerization. By virtue of the amino group, water-soluble acid salts can be prepared and the azo compounds are accordingly particularly useful in aqueous polymerization systems.

The azo compounds of this invention are readily obtained by the reaction of a ketone containing a tertiary amine group with hydrazine followed by reaction with hydrogen cyanide. The resultant hydrazo compound can be oxidized with chlorine or bromine to the desired amino azonitrile. The cyano group can be converted into various derivatives, e. g. esters or amides through the imide hydrochloride.

The following examples in which the parts given are by weight further illustrate the principles involved in this invention. The first examples (I, II, and III) show representative azonitriles while the subsequent examples illustrate the use of these compounds in the polymerization of ethylenically unsaturated compounds.

EXAMPLE I

*Alpha,alpha'-azobis(alpha - methyl - gamma-diethyl-aminobutyronitrile)*

A total of 42.5 parts of diethylamine hydrochloride, 32 parts of 37% formaldehyde and 90.5 parts of acetone was refluxed for two hours with the distillation of 24 parts of acetone from the reaction mixture, followed by heating the mixture (to which six parts of paraformaldehyde had been added) in a closed vessel for three hours at 100° C. Ether was then added and the aqueous layer made basic with sodium hydroxide. The oil was extracted with ether and gave upon distillation 25 parts of methyl beta-diethylaminoethyl ketone. This ketone was reacted with four parts of hydrazine hydrate at 25–50° C. for 16 hours and after cooling in an ice bath adjusted to a pH of about 6 (by adding 6.2 parts of hydrogen chloride in 20 parts of aqueous solution). This solution was mixed with 42 parts of hydrogen cyanide. After standing for about 16 hours at room temperature, excess hydrogen cyanide was removed by evaporation, 100 parts of water added and the solution cooled to 5–10° C. Chlorine was passed into the solution until free halogen was present. A portion of this solution was employed as a catalyst for the polymerization of acrylonitrile in water solution. The remainder was neutralized with an excess of sodium hydroxide solution (about 20 parts of a 40% solution) and the oil extracted by ether. Evaporation of the ether gave 17 parts of liquid azonitrile (64% yield based on the ketone) having the formula

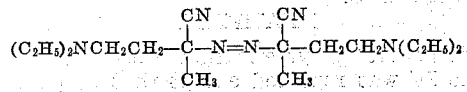

*Analysis.*—Neutral equivalent: Calculated: 167. Found: 170.

EXAMPLE II

*Alpha,alpha'-azobis(alpha-methyl-delta-diethyl-aminovaleronitrile)*

A mixture of 49 parts of diethylamine, boiling at 55.5° C. was refluxed with 40 parts of methyl gamma-chloropropyl ketone for 48 hours with stirring. A solution of 20 parts of sodium hydroxide in 75 parts of water was added and the oil which separated was extracted with ether, dried over anhydrous magnesium sulfate and distilled. There was obtained 29.5 parts of 5- diethylamino-2-pentanone. This amino ketone was charged in a flask with 4.7 parts of hydrazine hydrate and the mixture allowed to react at room temperature with stirring for 24 hours. To this solution was added a mixture of about 20 parts of concentrated hydrochloric acid and 15 parts of water to give a solution having a pH of 6. To this solution was added 28 parts of hydrogen cyanide. After standing 24 hours, excess hydrogen cyanide was removed by evaporation, 100 parts of water added, cooled to 5° C. and chlorine passed into the solution until free halogen was present. The reaction mixture was made basic with a 40% sodium hydroxide solution and the oil which separated was extracted with ether, dried and the solvent removed under reduced pressure. The azo compound (26 parts) was obtained as a clear yellow oil corresponding to a 76% yield. The azo compound had the formula

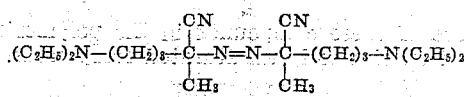

EXAMPLE III

*Alpha,alpha'-azobis(alpha-methyl-delta-piperidino-valeronitrile)*

When the general procedure of Example II was repeated except that piperidine was employed in place of diethylamine, there was obtained a 76% yield of the corresponding piperidino azonitrile of the formula

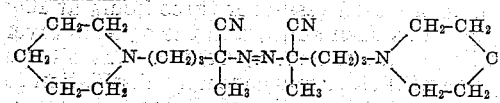

*Analysis.*—Calculated for $C_{22}H_{38}N_6 \cdot 2HCl$: N, 18.30%; Cl, 15.45%. Found: N, 17.36%; Cl, 15.63%. The hydrochloride melted with decomposition at 320–325° C.

EXAMPLE IV

A stainless steel-lined high-pressure reaction vessel was charged with 100 parts of water and 0.2 part of the azonitrile of Example I (alpha,-alpha'-azobis(alpha-methyl-gamma-diethylaminobutyronitrile)). The reactor was closed, flushed with nitrogen, evacuated and pressured with ethylene. The temperature was raised to 70° C. for a period of 11 hours with ethylene maintained at a pressure of about 900 atmospheres. A yield of 6 parts of solid ethylene polymer was obtained. The polymer had an intrinsic viscosity of 1.08, a tensile strength of 2650 lb./sq.in. at 560% elongation and a melting point of 122° C.

EXAMPLE V

The general polymerization procedure of Example IV was repeated except that 80 parts of benzene was used as the inert diluent in place of water and 0.1 part of the azonitrile of Example II (alpha,alpha'-azobis(alpha-methyl-omega-diethylaminovaleronitrile)) was employed as the catalyst. The polymerization temperature was 100° C. for 8–10 hours. There was obtained 6.5 parts of solid ethylene polymer which had an intrinsic viscosity of 0.86.

EXAMPLE VI

A reactor was charged with 78 parts of cyclohexane, 21.2 parts of acrylonitrile, and a polymerization catalyst and heated. When the catalyst was 0.19 part of the product of Example I (alpha,alpha'-azobis(alpha-methyl-gamma-diethylaminobutyronitrile)) and the heating was carried out at 50° C. for 22 hours, there was obtained a 25% yield of a polymer which had a relative viscosity at a concentration of 0.1% in dimethylformamide of 1.224.

When the catalyst was 0.29 part of the product of Example II (alpha,alpha'-azobis(alpha-methyl-delta-diethylaminovaleronitrile)) and the heating was for two hours at 60° C., a 28% yield of polyacrylonitrile was obtained.

EXAMPLE VII

A total of 100 parts of vinyl acetate was dissolved in about 80 parts of tertiary-butyl alcohol and 0.5 part of alpha, alpha'-azobis(alpha-methyl-gamma-diethylaminobutyronitrile) added. After agitation at 80° C. for 10 hours, a 21% yield of polyvinyl acetate was obtained.

EXAMPLE VIII

To 100 parts of vinyl chloride was added 0.5 part of the catalyst of Example I (alpha,alpha'-azobis(alpha-methyl-gamma-diethylaminobutyronitrile)). After 11 hours at 60° C. there was obtained a 10% yield of polyvinyl chloride.

The present invention is generic to azo compounds, and their use in the polymerization of ethylenic compounds subject to addition polymerization, which azo compounds have an acyclic azo, —N=N—, group at least one of the valences of which is bonded to tertiary carbon of a monovalent non-aromatic radical, said radical containing a tertiary amino group and containing on said tertiary carbon a carbon all of whose remaining valences are bonded to oxygen and/or nitrogen. Preferably the azo group is bonded to two such radicals. The substituent bonded to the tertiary carbon may be, for example, a cyano group, a carbonamido group or a lower carbalkoxy COOR group wherein R is methyl to hexyl, i. e., of one to six carbons. Preferably the azo compound contains only hydrogen, saturated aliphatic carbon and the cyano, tertiary amino and azo nitrogen. The tertiary amine group may be attached to any carbon which is removed from the azo group by at least one carbon.

The invention is therefore generic to alpha,alpha'-azobis(alpha-methyl-beta-dimethylaminopropionitrile) and alpha,alpha'-azobis(alpha-methyl-delta-morpholino-valeronitrile) in addition to those of the examples. The corresponding azo esters and amides are likewise included in this invention. The esters and amides are readily obtained from the nitrile by formation of the corresponding ether hydrochloride by reaction with an alcohol and hydrogen chloride followed by treatment with water or ammonia or a secondary amine, i. e., a hydrogen-bearing amine. In general, the more useful compounds are the azonitriles which have discrete groups containing 6 to 11 carbons attached to each of the azo nitrogens. The preferred compounds may be represented by the formula

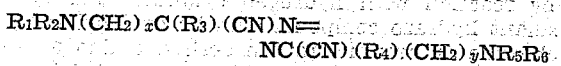

where $R_1$, $R_2$, $R_5$, and $R_6$ are lower alkyl radicals, e. g. methyl, ethyl, or butyl, or which form with each amino nitrogen a heterocyclic ring and $R_3$ and $R_4$ are lower hydrocarbon radicals, e. g. methyl to butyl and $x$ and $y$ are integers of 1 to 6 and preferably 1 to 3.

These compounds can be prepared by the following steps: (a) treatment of the tertiary amine-containing ketone with hydrazine to form the azine, (b) treatment of the resultant azine with hydrogen cyanide to form the corresponding hydrazonitrile, and (c) oxidation of the hydrazonitrile with chlorine or bromine to give the azonitrile. The above steps are preferably carried out in aqueous medium with the ketone present as a salt of the amino group. Steps (a) and (b) are preferably carried out at moderate temperatures such as 25–75° C. while the oxidation step (c) is generally at lower temperatures, e. g. —5 to 10° C. The azonitrile can be obtained by addition of alkali to the salt although as shown in Example I and for many similar polymerizations in aqueous systems the water-soluble salts may be used directly.

An important advantage exhibited by the azonitriles of this invention is their ability to be used as salts in water systems for polymerization reactions, particularly in acidic aqueous systems.

The azo compounds and particularly the azonitriles of this invention are of utility as catalysts for chain reactions, e. g. chlorination and chlorosulfonation, and particularly polymerization catalysts in the addition polymerization, including copolymerization, of polymerizable compounds containing ethylenic double bonds. The invention is generic to the polymerization of ethylenic compounds subject to polymerization, including monoolefins, e. g. ethylene, isobutylene and styrene; diolefins, particularly butadiene; vinyl esters, e. g. vinyl chloride, vinyl fluoride, vinyl acetate, vinyl propionate; vinylidene halides, e. g., vinylidene chloride and fluoride; vinyl ethers and ketones, e. g. vinyl butyl ether and methyl vinyl ketone; acrylyl and methacrylyl compounds, e. g. acrylonitrile, methyl methacrylate; polyfluoroolefins, e. g. tetrafluoroethylene, trifluorochloroethylene, and 1,1-di fluoro-2,2-dichloroethylene; and compounds containing two or more isolated or conjugated double bonds, e. g. the diacrylic acid esters of glycols and polyethylene glycols, for example, tetraethylene glycol dimethacrylate, diallyl diglycolate, diallyl carbonate, diallyl phthalate, chloroprene, and fluoroprene. A particularly important group to which the majority of the above polymerizable compounds belong is that of polymerizable compounds having a $CH_2=C<$ group, i. e., a terminal methylene group, i. e., a terminal ethylenic linkage.

The amount of the azo compound to be employed varies between 0.001 and 5%. The temperature usually employed is 40–125° C. or higher. Lower temperatures can be used when light is employed in conjunction with the azo compound. The polymerization can be carried out in bulk, solution, granulation, or emulsion systems.

In addition to the use of the azo compounds of this invention as polymerization catalysts, decomposition of the azo compounds by heating until nitrogen is evolved produces the corresponding dibasic acid derivatives in which the carboxylic derivative groups, e. g. the nitriles, are attached to adjacent carbons. Such derivatives may be used as intermediates in organic reactions.

The foregoing detailed description has been given for clearness of understanding only and no unnecessary limitations are to be understood therefrom. The invention is not limited to the exact details shown and described for obvious modifications will occur to those skilled in the art.

What is claimed is:

1. An aliphatic azo compound in which the azo group is acyclic and has each of its valences bonded to tertiary carbon of a monovalent aliphatic radical of 6 to 11 carbon atoms, said tertiary carbon being bonded to (a) a cyano, —CN, group, (b) an alkyl radical, and (c) a dialkylaminoalkyl radical.

2. An azo compound in which the azo group is acyclic and has each of its valences bonded to tertiary carbon of a monovalent radical of 6 to 11 carbon atoms, said tertiary carbon being bonded to (a) a cyano, —CN, group, (b) an alkyl radical, and (c) an alkyl radical having a tertiary amino nitrogen on carbon at least one carbon removed from the free valence, the tertiary amino nitrogen having its remaining valences bonded to members of the class consisting of alkyl radicals and radicals which together with the tertiary nitrogen form a heterocyclic ring.

3. An azo compound in which the azo group is acyclic and has each of its valences bonded to tertiary carbon of a monovalent radical of 6 to 11 carbon atoms, said tertiary carbon being bonded to (a) a cyano, —CN, group (b) an alkyl radical, and (c) an alkyl radical having, on carbon at least one carbon removed from the free valence a tertiary amino nitrogen the remaining valences of which are bonded to a divalent radical forming with the nitrogen a heterocyclic ring.

4. Alpha,alpha'- azobis(alpha - methyl - delta-diethylaminovaleronitrile).

5. Alpha,alpha' - azobis(alpha - methyl - delta-piperidinovaleronitrile).

6. Alpha,alpha'-azobis(alpha-methyl - gamma-diethylaminobutyronitrile).

JOHN RAVEN JOHNSON.

REFERENCES CITED

The following references are of record in the file of this patent:

UNITED STATES PATENTS

| Number | Name | Date |
|---|---|---|
| 2,471,959 | Hunt | May 21, 1949 |
| 2,492,763 | Pinkney | Dec. 27, 1949 |
| 2,515,628 | Castle | July 18, 1950 |
| 2,520,338 | Robertson | Aug. 29, 1950 |